United States Patent
Abraham et al.

(10) Patent No.: US 11,805,136 B2
(45) Date of Patent: Oct. 31, 2023

(54) SCANNING CONTAINER IMAGES AND OBJECTS ASSOCIATED WITH BUILDING THE CONTAINER IMAGES

(71) Applicant: HEWLETT PACKARD ENTERPRISE DEVELOPMENT LP, Houston, TX (US)

(72) Inventors: Rijil Abraham, Bangalore (IN); Prabhu Murthy, Bangalore (IN); Chandrasekaran Natarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 654 days.

(21) Appl. No.: 16/817,543

(22) Filed: Mar. 12, 2020

(65) Prior Publication Data
US 2020/0304526 A1    Sep. 24, 2020

(30) Foreign Application Priority Data
Mar. 18, 2019   (IN) .............. 201941010537

(51) Int. Cl.
*H04L 9/40*       (2022.01)
*G06F 9/455*      (2018.01)
*G06N 5/04*       (2023.01)
*G06N 20/00*      (2019.01)

(52) U.S. Cl.
CPC ...... *H04L 63/1416* (2013.01); *G06F 9/45558* (2013.01); *G06N 5/04* (2013.01); *G06N 20/00* (2019.01); *G06F 2009/45587* (2013.01); *G06F 2009/45595* (2013.01)

(58) Field of Classification Search
CPC ...... H04L 63/1416; G06N 20/00; G06N 5/04; G06F 9/45558
See application file for complete search history.

(56) References Cited

U.S. PATENT DOCUMENTS

| | | | |
|---|---|---|---|
| 11,321,064 B1* | 5/2022 | Frey ................. | G06F 21/64 |
| 2013/0247133 A1* | 9/2013 | Price .................. | G06F 21/577 |
| | | | 726/1 |
| 2016/0261624 A1* | 9/2016 | Berger ............... | H04L 63/06 |
| 2016/0381058 A1* | 12/2016 | Antony .............. | G06F 21/53 |
| | | | 726/23 |
| 2017/0054759 A1 | 2/2017 | Lee et al. | |
| 2017/0109536 A1* | 4/2017 | Stopel ............... | G06F 21/577 |
| 2017/0147813 A1 | 5/2017 | McPherson et al. | |
| 2017/0300697 A1 | 10/2017 | Iyer et al. | |
| 2018/0054469 A1* | 2/2018 | Simoncelli ......... | H04L 67/1097 |

(Continued)

OTHER PUBLICATIONS

Yin et al. (Star: A Specialized Tagging Approach for Docker, IEEE APSEC, 2018, pp. 426-435) (Year: 2018).*

(Continued)

*Primary Examiner* — Oleg Korsak
(74) *Attorney, Agent, or Firm* — Trop, Pruner & Hu, P.C.

(57) ABSTRACT

A technique includes accessing, by a computer, a container image that is built at least in part inside a virtual machine instance; and accessing, by the computer, an image of the virtual machine instance. Pursuant to the technique, the container image and the image of the virtual machine instance are scanned for security issues; and a result of the scanning is displayed by the computer.

22 Claims, 7 Drawing Sheets

(56) References Cited

U.S. PATENT DOCUMENTS

2018/0114025 A1     4/2018     Cui et al.
2020/0050966 A1*    2/2020     Enuka .................... G06Q 10/10

OTHER PUBLICATIONS

Deen, (Azure dev ops dockerfiles with multiline environment variables, private repos, and SSH keys: Sep. 20, 2018, 9 pages) (Year: 2018).*

Falk et al, "Static Vulnerability Analysis of Docker Images", BTH, Degree Project for Master of Science in Engineering Computer Security, 2017, 39 pages.

Microsoft Docs, "Securing Docker containers in Azure Container Service", available online at <https://docs.microsoft.com/en-us/azure/container-service/dcos-swarm/container-service-security>, Mar. 28, 2017, 5 pages.

Saied Kazemi, "Container-Optimized OS from Google is generally available", Google Cloud, available online at <https://cloud.google.com/blog/products/gcp/container-optimized-os-from-google-is-generally-available>, Apr. 5, 2017, 3 pages.

Shu et al., "A Study of Security Vulnerabilities on Docker Hub", ACM, Mar. 22-24, 2017, pp. 269-280.

SriSudha, "Secure your containers and images in IBM Cloud Private with Vulnerability Advisor", IBM Cloud, available online at<https://medium.com/ibm-cloud/secure-your-containers-and-images-in-ibm-cloud-private-with-vulnerability-advisor-650578e60bfa>, Apr. 13, 2018, 5 pages.

Trend Micro, "Deep Security Smart Check—Container Image Security", available online at <https://www.trendmicro.com/en_in/business/products/hybrid-cloud/smart-check-image-scanning.html>, retrieved on Mar. 23, 2020, 6 pages.

* cited by examiner

SCANNING CONTAINER IMAGES AND OBJECTS ASSOCIATED WITH BUILDING THE CONTAINER IMAGES

BACKGROUND

A cloud computing environment provides scalable and pooled computing, storage and networking resources in the form of cloud services. As examples, the cloud services may be Software as a Service (SaaS); Infrastructure as a Service (IaaS), and Platform as a Service (PaaS). The cloud computing environment may be a public cloud in which the cloud services are available to the general public over the Internet or a private cloud that may be, for example, contained within a business organization's private network.

DETAILED DESCRIPTION

Figure 1:
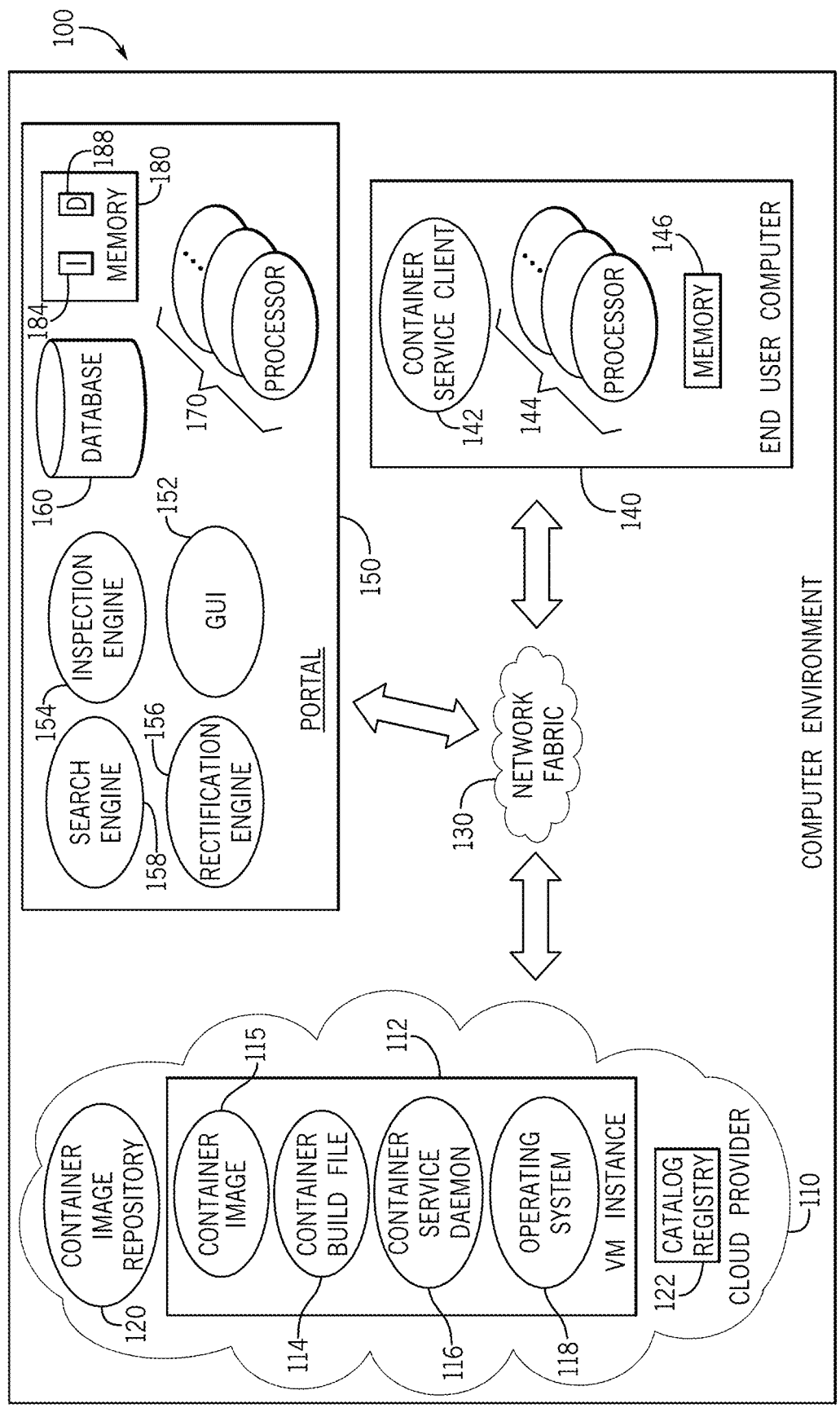
FIG. 1 is a schematic diagram of a computer environment constructed to scan container images, virtual machine instance images and container build files according to an example implementation.

A cloud computing environment may take on numerous forms. For example, a private cloud computing environment may be provided by an organization's computer system, such as, for example, an onsite datacenter that includes hardware and software resources, such as clients, servers, network switches, routers, and so forth. Such a private cloud computing environment may provide a wide variety of cloud services, such as Software as a Service (SaaS), Infrastructure as a Service (IaaS), Platform as a Service (PaaS), and so forth.

In general, in a private cloud computing environment, the cloud services are not available to the general public, and as such, access to the private cloud computing environment is generally limited to tenants that are associated with the organization that owns the private cloud computing environment, such as employees and departments of a business organization, students, faculty and researchers of an educational institution, and so forth. The private cloud computing environment may include an information technology (IT) infrastructure that is partially or wholly owned by the organization.

The cloud computing environment may be a public cloud computing environment. The public cloud computing environment is an environment that is generally accessible by the public.

The cloud computing environment may be associated with both a private cloud computing environment and a public cloud computing environment. In this manner, a hybrid cloud computing environment contains IT infrastructure that may be owned by a particular organization and an IT infrastructure (a publically accessible infrastructure, for example) that is owned by a third party.

A particular tenant may subscribe to one or more cloud services. For example, a particular tenant may subscribe to IaaS and as a more specific example, as part of this IaaS subscription, may lease one or multiple virtual machines (also called "VMs"). In general, a virtual machine is an emulation, or abstraction of physical hardware of a computer system. For example, a virtual machine may emulate a server; and, as an example, multiple virtual machines may turn an underlined physical server into multiple virtual servers. The virtual machine contains a guest operating system, one or multiple applications, binaries and libraries, and so forth.

The virtual machine is an example of an abstraction that may be used on a host, such as a physical platform host. Another example of an abstraction that may be used on a host is a container. Here, the "host" may be a physical platform host or a virtual machine. A container is a unit of software that packages up one or multiple applications that are dependent upon one another, the associated binaries, configuration files, libraries, and so forth. The container is constructed from a container image, and an instance of the container image is called a "container." As compared to a virtual machine, a container shares a host operating system kernel so that multiple containers may run as isolated processes on the same host and share the operating system kernel.

A cloud provider may provide a catalog, or registry, of available container images, which may be used and possibly further modified to create custom container images as part of the IaaS. The registry may indicate scanning results of the published container images for particular known security vulnerabilities and threats. However, when constructing a customized container image from one or multiple other published based images, security threats and vulnerabilities may unknowingly be introduced into the customized container image.

In accordance with example implementations that are described herein, as part of a portal, an inspection engine monitors (periodically polls, for example) a catalog, or registry, that is provided by a cloud provider for purposes of identifying virtual machine instances (as specified by search criteria and specified by a user, for example) that are running on a cloud computing environment. The inspection engine examines the virtual machine instances to detect the construction of image containers inside the virtual machines. For each of the detected virtual machine instances, the inspection engine scans the container image for purposes of identifying potential security issues with the container image, such as potential security vulnerabilities and threats (also referred to by the more succinct designation as potential "security vulnerabilities" or "vulnerabilities," herein). Moreover, in accordance with example implementations that are described herein, the inspection engine further scans the virtual machine instances for potential security threats and vulnerabilities and, in accordance with example implementations, also performs such security scans on build files that are used to construct the container images.

A user, such as a user associated with a developer, may use the result of such scans to readily identify potential security issues that are associated with container images, build files and virtual machine instances that are being developed. Moreover, as described herein, the inspection engine may, based on the results of the tags and possible interaction by the user through a graphical user interface (GUI), tag, or label, the scanned container images, virtual machine instances and build files with tags that identify attributes of these objects. For example, a particular tag may identify whether the associated object is trusted or untrusted. A tag may also identify, for example, whether use of the associated object is to be blocked or is to be rectified to address the security issue. In accordance with some implementations, the inspection engine may initiate a rectification operation by a rectification engine associated with the portal to correct one or multiple identified security issues with a particular object so that the object may thereafter be trusted.

As a more specific example, in accordance with some implementations, FIG. 1 depicts a computer environment 100 that allows a user (a user associated with a microservice developer, as an example) to develop container images inside virtual machine instances, and, at the same time, scan the container images, associated build files and the virtual machine instances for security issues (security threats and vulnerabilities, for example). In general, the computer environment 100 contains network fabric 130, which allows end users to, through their end user computers 140, communicate with a cloud computing environment 110 for purposes of creating one or multiple virtual machine instances 112 and creating one or multiple container images 115 inside the virtual machine instances 112.

In general, depending on the particular implementation, the cloud computing environment 110 may be a public cloud computing environment, a private cloud computing environment, or a hybrid cloud computing environment.

In general, the network fabric 130 includes public access network fabric and may include components that use protocols that are associated with any type of communication network, such as (as examples) Fibre Channel networks, iSCSI networks, ATA over Ethernet (AoE) networks, Hyper-SCSI networks, local area networks (LANs), wide area networks (WANs), global networks (e.g., the Internet), or any combination thereof.

The end user computer 140 may be any type of processor-based machine, such as, as examples, a laptop computer, a desktop computer, a tablet computer, a smartphone, and so forth.

In accordance with example implementations that are described herein, an end user may scan container images, virtual machine instances and container build files through the use of a portal 150. In accordance with example implementations, the portal 150 is provided by a physical processor-based platform, and depending on the particular implementation, the portal 150 may be an actual physical machine or may be one or multiple virtual machines that are hosted on a physical machine. Regardless of its particular form, the portal 150 includes a graphical user interface (GUI) 155. In general, the GUI 152 may be accessed by the end user for purposes of setting up search criteria, which the portal 150 uses to identify virtual machine instances, such as depicted virtual machine instance 112, which the end user is using to construct container images.

More specifically, in accordance with some implementations, the portal 150 may include a search engine 158, which, through its configuration through the GUI 152, may search the cloud computing environment 110 for virtual machine instances, such as depicted virtual machine instance 112, which satisfies certain search criteria. In accordance with some implementations, the search engine 158 may periodically, or pursuant to some other schedule, poll a registry, or catalog 122 that is provided by the cloud computing environment 110 for purposes of identifying virtual machine instances that satisfy certain search criteria specified by the user.

In accordance with example implementations, the search engine 158 may retrieve an image of each virtual machine instance identified in its search for purposes of identifying container images that are being constructed in the virtual machine instances. Unlike published container images that may be, for example, part of a container image repository 120 of the cloud computing environment 110, the container images that are created inside the virtual machine instances have not been checked for security issues.

In accordance with example implementations, an inspection engine 154 of the portal 150 runs a security scan on the container images that are identified by the search engine 158. Additionally, in accordance with some implementations, the inspection engine 154 runs security scans on the virtual instances in which the container images are created and runs scans on associated container build files, which are associated with containers that are being constructed by the user.

In general, a "container build file," or "build file," refers to a file (a text file, for example) that specifies commands, or instructions, for building, or constructing, a particular container image. An example of a container build file is a Dockerfile.

For the specific example depicted in FIG. 1, the virtual machine instance 112 is running in the cloud computing environment 110 and contains a container service background process, or daemon 116, which communicates with a container service client 142 of the end user computer 140. The user, through the end user computer 140, may, for example, create a container build file 114, which, serves as an input to the container service daemon 116 for purposes of constructing a container image 115. As depicted in FIG. 1, the virtual machine instance 112 may have other features, such as a guest operating system 118. Moreover, although FIG. 1 depicts the virtual machine instance 112 as containing a single container build file 114 and a single container image 115, it is understood that, in accordance with further example implementations, a particular virtual machine instance, such as virtual machine instance 112, may contain multiple container build files 114, multiple container images 115, and so forth.

As described further herein, the inspection engine 154 of the portal 150 may, upon receiving information from the search engine 158, which identifies a particular virtual machine instance and its associated container image(s) and container build file(s) (as examples), search a local database 160 of the portal 150. This search may be used to determine whether particular objects (virtual machine instances, container images, build files, and so forth) have been scanned by the inspection engine 154 for security vulnerabilities. In this manner, in accordance with example implementations, the database 160 contains entries, where each entry may have an identifier for a particular object, as well as a label, or tag, that represents a scanning status for the object.

In accordance with some implementations, the tag for an object may, for example, specify whether the object is trusted on untrusted; specific whether use of the object has been blocked; specify whether the image is being rectified to overcome security issues(s) (as further described herein), and so forth. If, upon inspection of the database 160 for a particular object, the inspection engine 154 does not find, or locate, the particular object then, in accordance with example implementations, the inspection engine 154 may initiate a scanning of the object for security vulnerabilities. In accordance with some implementations, the decision of whether to automatically initiate scanning of an object; and criteria pertaining to how to label, or tag, the object, as well as the search criteria, may be specified through user input received through the user's interaction with the GUI 152.

In accordance with some implementations, the inspection engine 154 may, through the scanning process, check and analyze a particular object (container image, virtual machine instance, or build file, as examples) for any security vulnerabilities. The object may be, in general, any object that is consumed for production, development or testing, in accordance with example implementations. The inspection engine 154 adds a label, or tag, to the object, which labels the objects as being trusted or untrusted. Moreover, in accordance with some implementations, in addition to the tag and identifier for the object, the inspection engine may add additional information to the corresponding entry in the database 160, such as information regarding the details of the checks that were performed in the scanning of the object.

In accordance with some implementations, through the GUI 152, the portal 150 may provide an option to the end user to rectify any security issues that were identified in the scan, and the portal 150 may, through the GUI 152, provide an option to lock the image to prevent its consumption until the associated security vulnerability(ies) are corrected, or rectified. Moreover, in accordance with example implementations, the GUI 152 may, in general, provide a dashboard listing of all of the untrusted images and VM instances running containers.

More specifically, in accordance with some implementations, through the GUI 152, the end user may be given an option to inspect a particular object by selecting a single or multiple container image; selecting a container image build file before the build file is pushed into a published registry; select a single or multiple virtual machine instances running containers; and so forth. After selecting one of these options, the inspection engine 154 may then process the corresponding objects (container images, virtual machine instances, container build files, and so forth) and certify the object(s) as being trusted and untrusted based on the results of the scan.

Depending on the particular implementation, the inspection engine 154 may perform various checks associated with the scanning of a particular object. As examples, these checks may be checks to examine security profiles, such as profiles that place the virtual machine instance in a secure computing mode; network security checks against exposing the container to a socket connection; the use of open source tools; checking for environmental variables that contain secret keys pressing in the virtual machine instances; and so forth. Moreover, in accordance with example implementations, through the GUI 152, the end user may define customized policies and/or profiles that serve as bases for further security checks, in accordance with example implementations.

In accordance with example implementations, the portal 150 may be provided by a physical processor-based platform that includes one or multiple actual physical machines that execute machine executable instructions (or "software"). It is noted that, in accordance with example implementations, the physical machine(s) may create one or multiple virtual machines; and the components of the portal 150, such as the inspection engine 154, GUI 152, search engine 158 and rectification engine 156, may execute on one or multiple virtual machines. In accordance with example implementations, the portal 150 may include one or multiple physical hardware processors 170, such as one or multiple central processing units (CPUs), one or multiple CPU cores, and so forth.

Moreover, the portal 150 may include a memory 180. In general, the memory 180 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 180 may store various data 188 (data representing search criteria applied by the search engine 158; customized security policies or protocols defined by the end user for the checks used in the security scan; option information, such as whether to automatically rectify untrusted images; data to be updated to the database 160; data representing objects retrieved from the cloud computing environment 110 to be scanned; inclusion lists representing security issues that do not fail the object from being trusted; exclusion lists, which specify security issues that cause the object to be untrusted; and so forth).

The memory 180 may also store machine executable instructions 184 and/or application data (or "software"), which are executed by the processor(s) 170. In general, the machine executable instructions 184, when executed by one or multiple processors 170, cause the processor(s) 170 to form one or multiple components of the portal 150, such as, for example, the inspection engine 154, the GUI 152, the search engine 158, the rectification engine 156, and so forth. In accordance with example implementations, one or multiple components of the portal 150 may be provided by hardware that does not execute machine executable instructions, such as, for example, an Application Specific Integrated Circuit (ASIC) or a field programmable gate array (FPGA).

Figure 2A:
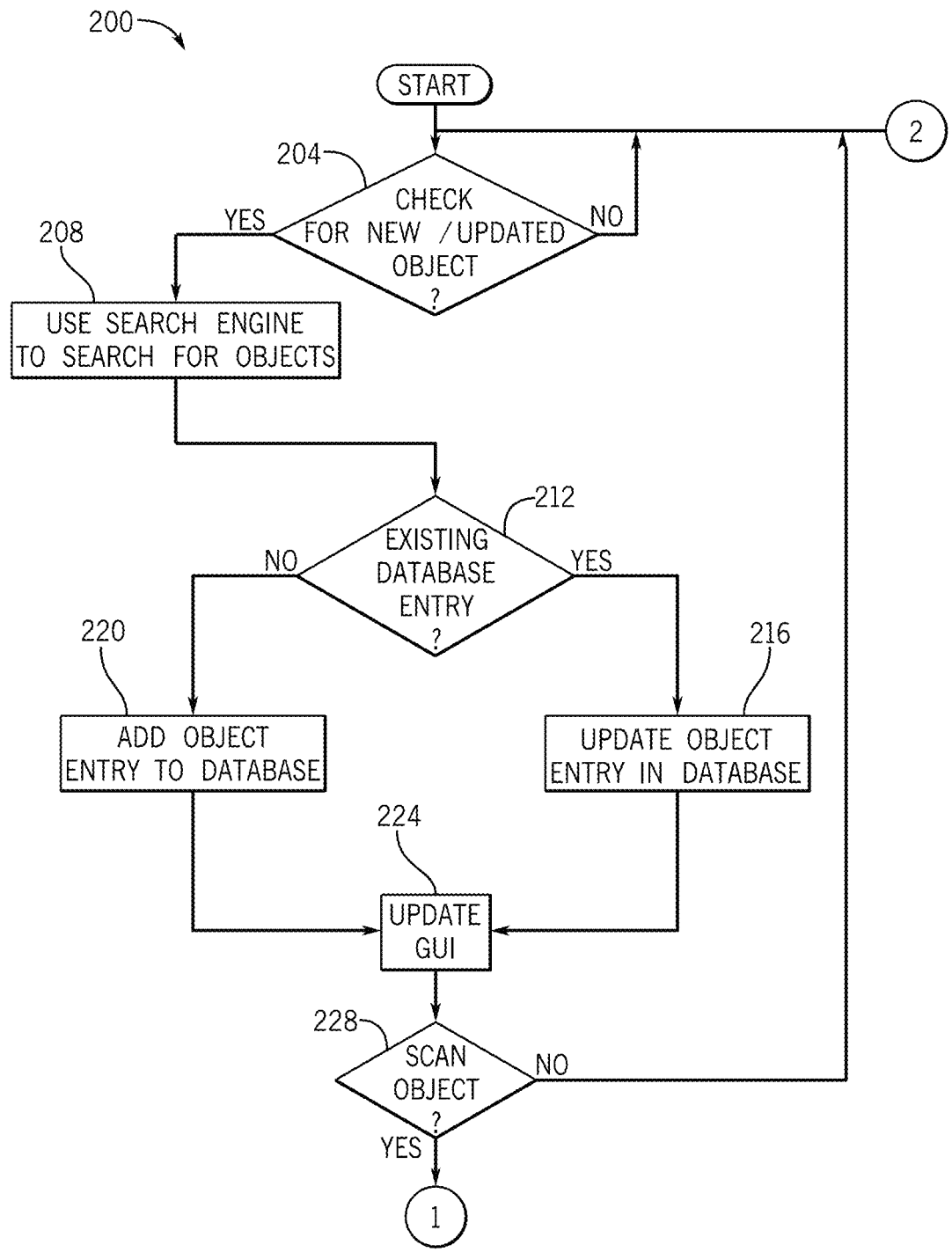
FIGS. 2A and 2B depict a flow diagram associated with a portal of FIG. 1 to detect and scan container images, virtual machine instance images and container build files according to an example implementation.
Figure 2B:
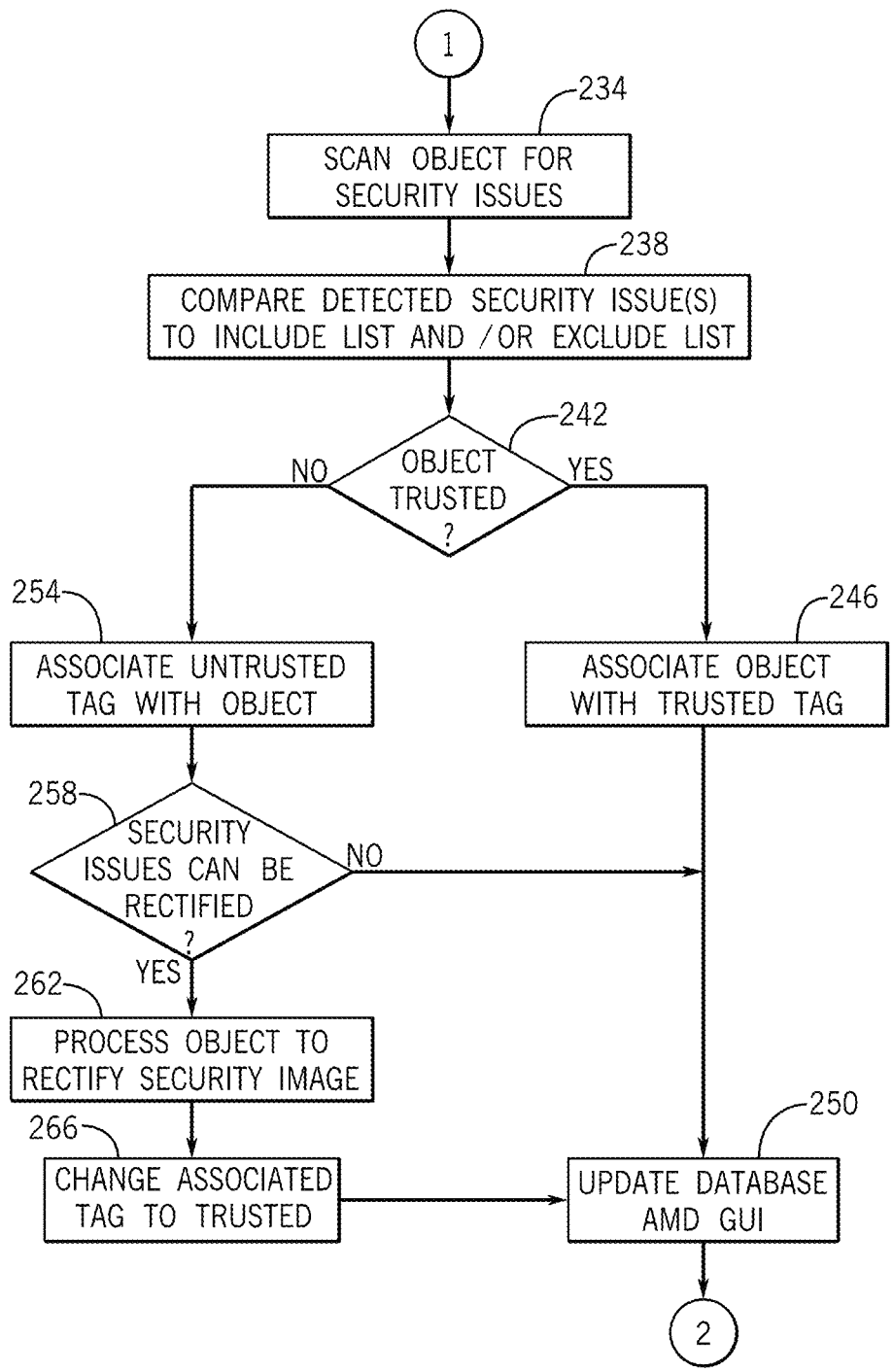

FIGS. 2A and 2B depict a technique 200 that may be used by the portal 150 for purposes of allowing a user to manage the security scanning and potential rectification of objects associated with virtual machine instances and associated objects that are being constructed in a cloud computing environment. More specifically, the technique 200 may allow the end user to perform such functions as scanning objects, reporting results of the scan, rectifying objects and so forth.

More specifically, referring to FIG. 2A in conjunction with FIG. 1, in accordance with example implementations, the search engine 158 determines (decision block 204) whether it is time to check for a new or updated object.

As such, if so, the search engine 158 is used (block 208) to search for objects. In this manner, in accordance with some implementations, the search engine 158 applies search criteria defined by the user to search the catalog 110 of the cloud provider 110 for virtual machine instances that satisfy the search criteria. The search engine 158, in accordance with example implementations, examines the corresponding virtual machine instance images to identify objects (in addition to the virtual machine instance) that are to be scanned. In this manner, upon examination, the inspection engine 158 may identify one or multiple container images, one or multiple container build files, and so forth.

For the remaining examples described herein in connection with FIGS. 2A and 2B, the specific case of a single object is considered. In this manner, for clarity, the case of a single object is scanned, where the single object may be any object described herein, such as a virtual machine instance, a container image, a build file, and so forth.

In accordance with some implementations, before retrieving the particular object from the cloud computing environment 110, the inspection engine 154 may first check the database 160 to determine (decision block 212) whether an existing database entry exists in the database 160. If not, then the inspection engine 154 may add a corresponding object entry to the database 160 and retrieve the object from the cloud computing environment 110. Otherwise, if an existing database entry exists, then the scan engine 154 may update (block 216) the object entry in the database 160.

Next, pursuant to block 224, in accordance with example implementations, the scan engine 154 updates the GUI 152 to identify the object that may be scanned. In this manner, in accordance with some implementations, through the GUI 152, the end user may select the object for scanning or may deselect the object so that no scanning is performed.

Referring to FIG. 2B in conjunction with FIG. 1, if scanning for vulnerabilities is to be performed, then, pursuant to block 234, the inspection engine 154 scans the object for any security issues, such as security vulnerabilities and/or security threats, pursuant to the specific policies established by a set of security checks that are applied by the scanning. In accordance with some implementations, the inspection engine 154 compares (block 238) the detected security issue(s) to an include list and/or an exclude list. In this manner, in accordance with some implementations, an include list specifies security issues that are deemed to be acceptable for a trusted image; and the exclude list sets forth security issues that may individually be considered to be unacceptable for a trusted image. Accordingly, pursuant to decision block 242, the inspection engine 154 then determines whether the object is trusted or untrusted. If trusted, then the inspection engine 154 associates (block 246) the object with a trusted tag and updates (block 250) the database 160 and the dashboard of the GUI 152 to reflect the trusted state of the object.

Otherwise, pursuant to block 254, if the object is untrusted, the inspection engine 154 associates the untrusted tag with the object and determines (decision block 258) whether the corresponding security issue(s) can be rectified. In this manner, in accordance with some implementations, the inspection engine 154 may consult a list of security issues to which there are known fixes to resolve the security issues. Moreover, the inspection engine 154 may, in a similar manner, consult a list that identifies particular security issues that cannot be resolved; or the security inspection engine 154 may assume the same if a known fix is not found. If, the security issue(s) cannot be rectified (pursuant to decision block 258), then the inspection engine proceeds to update the database 160 and the GUI 152 (block 250) to reflect the untrusted state of the object.

In accordance with some implementations, the inspection engine 154 may, through the GUI 152, prompt the user to make a decision whether to block the untrusted image for consumption. If, pursuant to decision block 258, a decision is made by the inspection engine 154 that the security issue(s) can be revolved, such that the object may be placed in a trusted state, then, the rectification engine 156 processes (block 262) the object to rectify the security issue(s) and changes (block 266) the associated tag to be a trusted tag before updating the database 160 and GUI 152, pursuant to block 250. In this manner, in accordance with some implementations, the rectification engine 156 may, for example, consult a database to apply known fixes to known security vulnerabilities.

Figure 3:
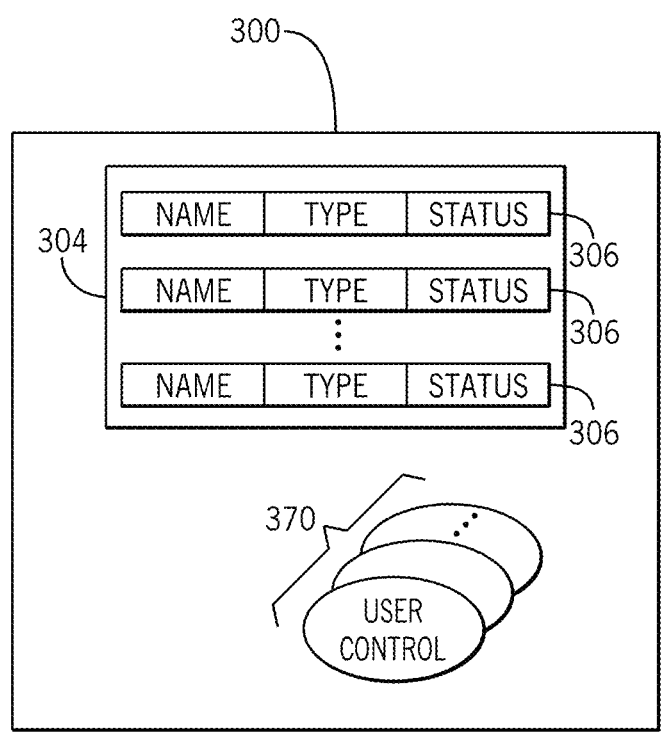
FIG. 3 is an illustration of a visual output provided by a graphical user interface (GUI) of the portal of FIG. 1 according to an example implementation.

FIG. 3 depicts an example graphical output 300 of the GUI 152 in accordance with some implementations. As shown, the GUI 152 may display, at least in part, a dashboard window 304, in which entries 306 are presented and are associated with objects and their states. For this specific example, a particular entry 306 may contain a name identifier for an object, a type (container image, virtual machine instance, or build file) and state of the object. In accordance with some implementations, the dashboard 304 may display entries 306 corresponding to the more recent identified objects and may allow the user to scroll through the entries 306 in a chronological order. Moreover, in accordance with example implementations, the GUI 152 may provide one or multiple user controls 370 (graphical buttons, user input fields, and so forth) for purposes of allowing the end user to manipulate the GUI 152, select various options, define scan criteria, control the tagging or other status of objects, and so forth.

In accordance with further example implementations, one or multiple components of the portal 150 may apply machine learning, such as supervised machine learning (a trained decision tree, for example). For example, in accordance with some implementations, the inspection engine 154 may contain a supervised machine learning model, which is trained on multiple objects (container images, build files, virtual machine instances, and so forth) and their associated states (i.e., labels). In this manner, features of the objects on which the model is trained may be extracted and converted into a feature vector; and this feature vector, along with the corresponding label (a trusted on untrusted state, as an example) may be provided as inputs for purposes of training the model. In its application, the model may receive features describing a current model to be classified, and may receive a feature vector representing features of a current object to be classified, and based on the feature vector, may classify the object, i.e., determine whether the object is to be trusted, untrusted, and so forth. In accordance with example implementations, the model may also receive feedback input and further adapt. In this manner, in accordance with some implementations, the machine learning engine may conduct ongoing training by observing actions taken by the end user, such as actions that reverse the models' classification, further refine the classification, and so forth.

In accordance with example implementations, other components of the portal 150 may apply machine learning, such as supervised machine learning. In this manner, in accordance with some implementations, the rectification engine may apply machine learning for purposes of determining solutions for certain security issues (features) and may rely on a model that is trained, in a similar manner to that described above.

Figure 4:
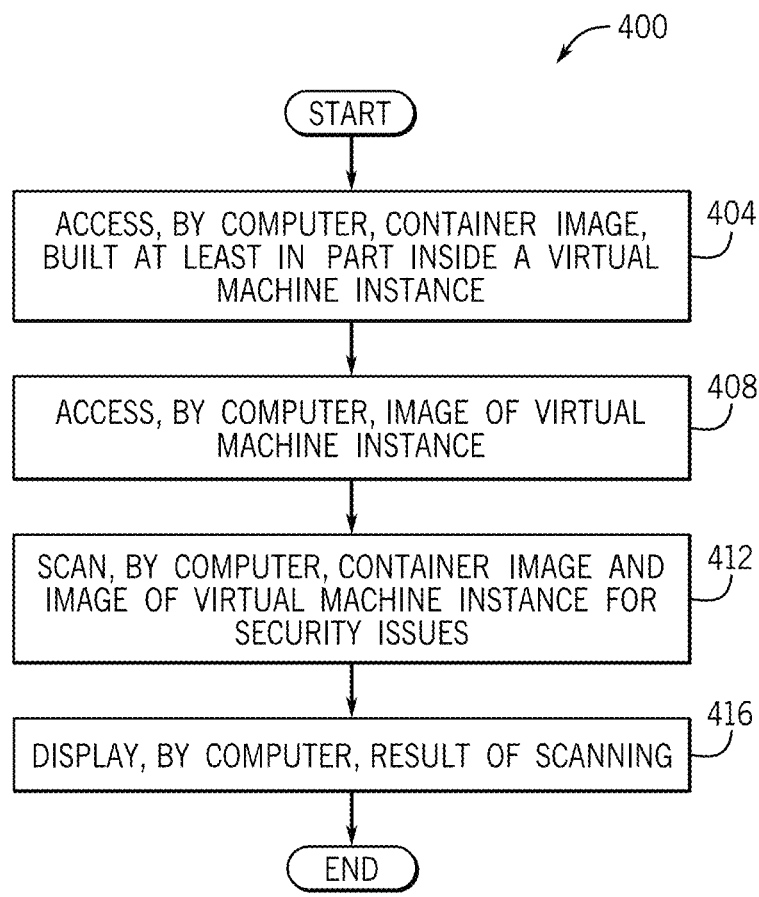
FIG. 4 is a flow diagram depicting a technique to access and scan a container image and an image of a virtual machine instance for security issues according to an example implementation.

Referring to FIG. 4, in accordance with example implementations, a technique 400 includes accessing (block 404), by a computer, a container image that is built at least in part inside a virtual machine instance; and accessing (block 408), by the computer, an image of the virtual machine instance. Pursuant to the technique 400, the container image and the image of the virtual machine instance are scanned (block 412) for security issues; and a result of the scanning is displayed by the computer, pursuant to block 416.

Figure 5:
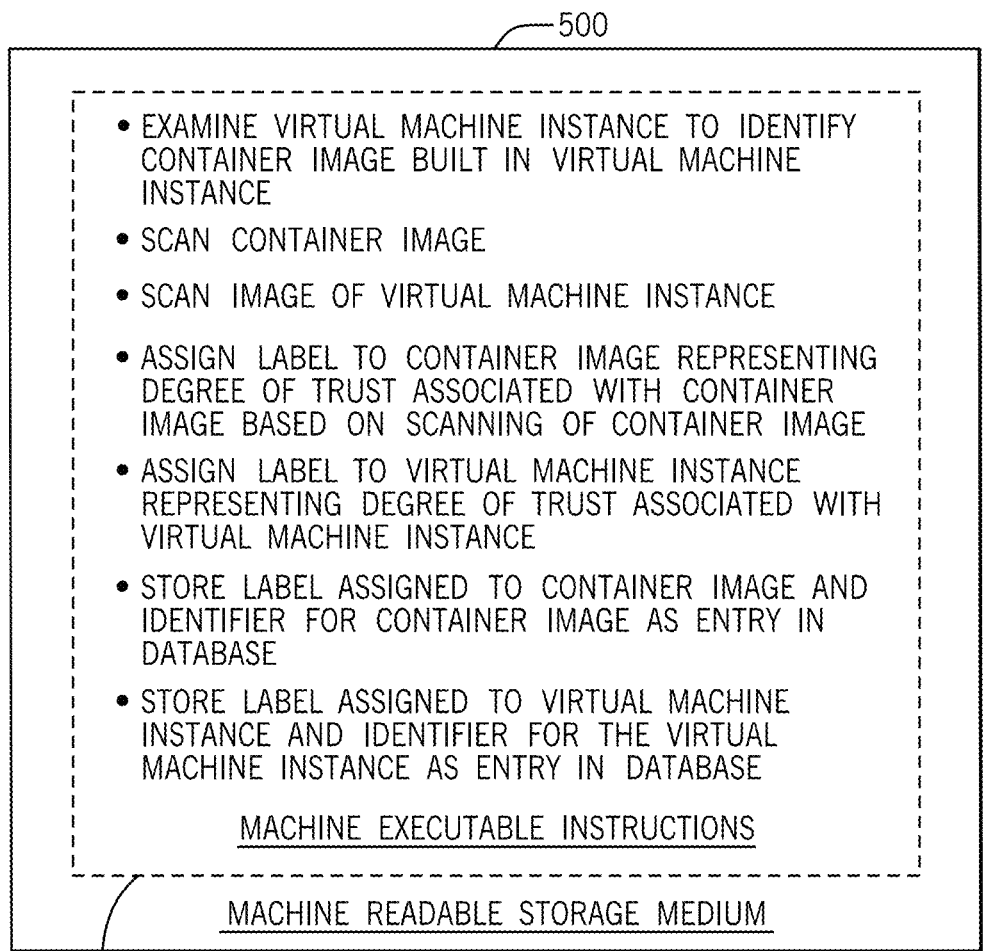
FIG. 5 is an illustration of a non-transitory machine readable storage medium that stores machine readable instructions that are executed by a machine to cause the machine to scan a container image and a virtual machine instance image according to an example implementation.

Referring to FIG. 5, in accordance with example implementations, a non-transitory machine readable storage medium 500 stores machine readable instructions 510 that, when executed by a machine, cause the machine to examine a virtual machine instance to identify a container image built inside the virtual machine instance; scan the container image; scan the virtual machine instance; assign a label to the container image representing a degree of trust that is associated with the container image based on the scanning of the container image; assign a label to the virtual machine instance representing a degree of trust associated with the virtual machine instance; store the label that is assigned to the container image and an identifier for the container image as an entry in a database; and store the label assigned to the virtual machine instance and an identifier for the virtual machine instance as an entry in the database.

Figure 6:
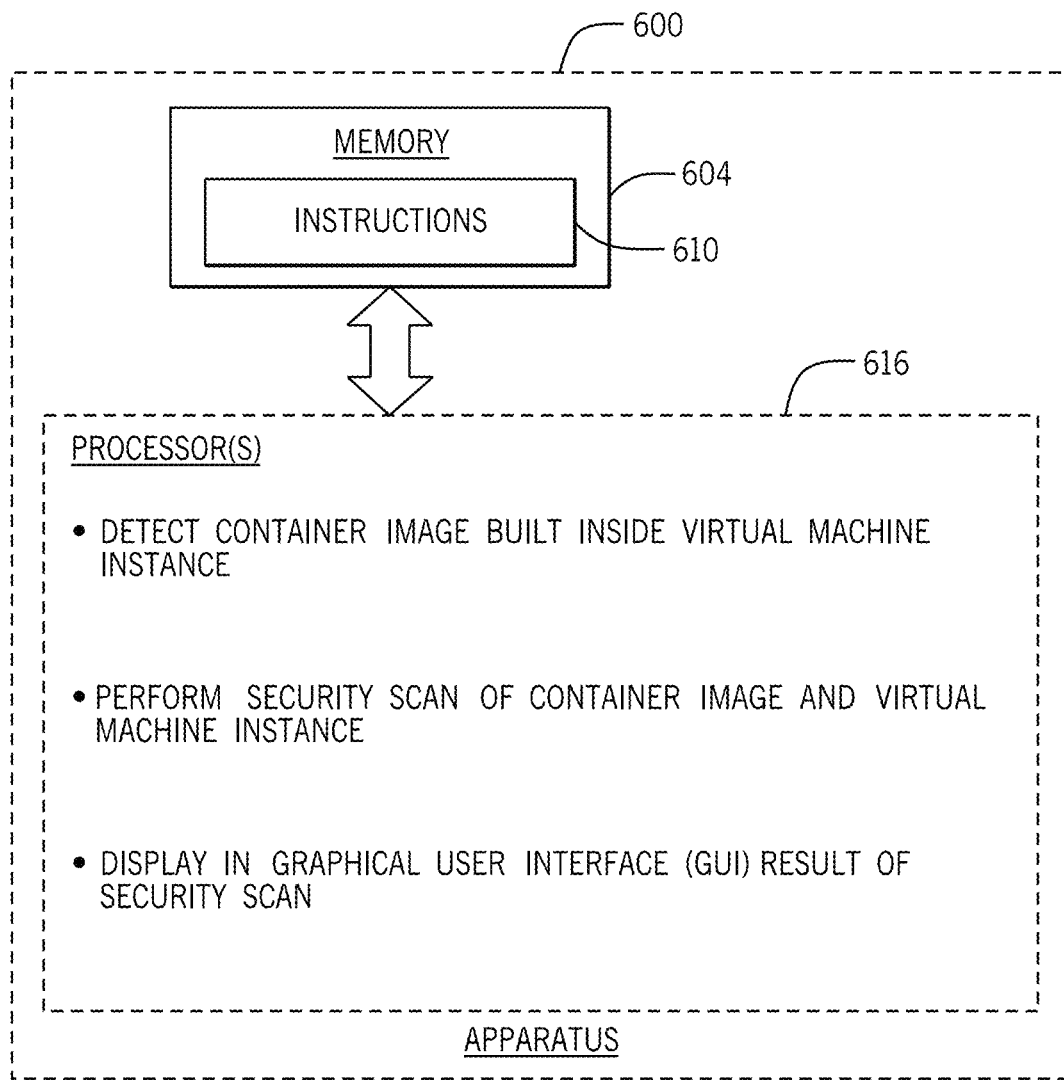
FIG. 6 is a schematic diagram of an apparatus to detect a container image built inside a virtual machine instance, perform a security scan of the virtual machine instance and display a result of the security scan in a graphical user interface (GUI) according to an example implementation.

Referring to FIG. 6, in accordance with example implementations, an apparatus 600 includes at least one processor 616 and a memory 604 to store instructions 610 that, when executed by the processor(s) 616, cause the processor(s) 616 to detect a container image built inside a virtual machine instance; perform a security scan of the virtual machine instance and the container image; and display in a graphical user interface (GUI) a result of the security scan.

In accordance with example implementations, the systems and techniques that are described herein may have one or more of the following features. The scanning of the container image and the virtual machine instance may include applying machine learning to determine at least one of whether the container image is trusted or whether the virtual machine instance is trusted. A particular advantage of the use of machine learning is that trusted and untrusted classification may be more accurately assigned and may adapt to future security vulnerabilities and threats.

The result of the scanning of the container image and virtual machine instance may be displayed in a graphical user interface (GUI) and a user control may be displayed in the GUI to take at least one action on the container image. A particular advantage of such a user control being displayed in the GUI is to allow a user to take a particular course of action, such as, for example, initiating rectification of the container image, blocking further use of the container image and so forth, based on the results of the scan.

The user control displayed in the GUI may allow the initiation of blocking of the container image from being used; and in response to the user control being selected to initiate blocking, a tag may be generated representing an untrusted state for the container image such that the tag may be stored with an identifier of the container image in a database. A particular advantage of this technique is that the container images clearly identified as being untrusted but may still be used in the future, if the problems associated with the container image may be rectified.

The scanning of the container image may identify a security issue but is associated with the container image and may further determine whether the identified security issue can be rectified. Moreover, displaying the user control may include displaying a user control to initiate rectification of the container image so that in response to selection of the user control to initiate rectification, the container image may be modified to remove the identified security issue to provide a modified container image, and an identifier of the modified container image and a tag representing the modified container image as being trusted, may be stored. The particular advantage of this is that known fixes may be applied for certain security vulnerabilities and threats to allow the container image to be used.

The virtual machine instance may provide a plurality of microservices. A particular advantage of this arrangement is that the virtual machine instance may be hardened against security vulnerabilities and threats for purposes of facilitating the modification and development of container images inside the virtual machine instance to provide the microservices.

Accessing the container image may include identifying the virtual machine instance in a registry that is provided by a cloud provider; identifying the container image in the virtual machine instance; and retrieving the container image from the cloud provider. A particular advantage of this technique is that unpublished container images that are being constructed inside virtual machine instances may be readily identified and scanned for potential security vulnerabilities and threats.

The virtual machine instance may be scanned to detect a container image build file; and the container image build file may be scanned for security issues. This allows further hardening of the constructed container image from potential security vulnerabilities and threats.

Determining whether the container image is trusted may be based on at least one of determining whether the identified security issue is contained in a first list that represents security issues associated with untrustworthiness or in a second list representing security issues associated with trustworthiness. A particular advantage of this trustworthiness/untrustworthiness classification is that known vulnerabilities and threats may be applied in a list-based approach to accurately and readily identify whether the container image is trusted or not.

The scanning of the container image may scan for program code associated with defining secure mode computing; scan the container image for program code associated with exposing a privileged operating system kernel connection to an instance of the container image; and/or scan the container image for an environmental variable containing a private key. By scanning for these specific features, specific ways for identifying security vulnerabilities and threats may be readily identified.

Machine learning may be applied to features of a virtual machine instance to determine whether to trust the virtual machine instance. A particular advantage of the use of machine learning in this manner allows more accurate and efficient identification of trust issues and allows the adaptation of recognizing trustworthiness and untrustworthiness with changing technologies. The machine learning may be supervised machine learning in that a supervised machine learning model may be applied that is trained on features of a plurality of virtual machine instances and classifications that are assigned to these virtual machine instances. A particular advantage is that the machine learning model may be trained on expert labeled classifications of trustworthy and untrustworthy images.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
   accessing, by a computer, a container image, built at least in part inside a virtual machine instance, wherein the virtual machine instance provides a plurality of microservices;
   accessing, by the computer, an image of the virtual machine instance;
   scanning, by the computer, the container image and the image of the virtual machine instance for security issues, wherein the scanning comprises determining whether the container image is trusted based on determining whether an identified security issue is contained in at least one of a first list representing security issues associated with untrustworthiness or a second list representing security issues associated with trustworthiness; and displaying, by the computer, a result of the scanning.

2. The method of claim 1, wherein the scanning comprises applying machine learning to determine at least one of whether the container image is trusted or whether the virtual machine instance is trusted.

3. The method of claim 1, further comprising:
generating a tag representing a result of the scanning of the container image; and
storing the tag with the container image in a database.

4. The method of claim 1, wherein displaying a result of the scanning comprises displaying the result in a graphical user interface (GUI), the method further comprising:
displaying a user control in the GUI to take at least one action on the container image.

5. The method of claim 4, wherein displaying the user control comprises displaying a user control to initiate blocking of the container image from being used, the method further comprising:
in response to selection of the user control to initiate blocking, generating a tag representing an untrusted state for the container image and storing the tag with an identifier of the container image in a database.

6. The method of claim 4,
wherein the scanning comprises identifying a security issue associated with the container image and determining whether the identified security issue can be rectified;
wherein displaying the user control comprises displaying a user control to initiate rectification of the container image; and
the method further comprises:
in response to selection of the user control to initiate rectification, modifying the container image to remove the identified security issue to provide a modified container image and storing an identifier of the modified container image and a tag representing the modified container image as being trusted.

7. The method of claim 1, wherein the scanning comprises identifying a security issue associated with the container image and determining whether the identified security issue can be rectified.

8. The method of claim 1, wherein accessing the container image comprises:
identifying the virtual machine instance in a registry provided by a cloud provider;
examining the virtual machine instance to identify the container image; and
requesting the container image from the cloud provider.

9. The method of claim 1, further comprising:
examining a virtual machine instance to identify a container image build file; and
scanning the container image build file for security issues.

10. The method of claim 1, further comprising, when the container image is determined to be trusted, generating or updating a database entry to associate an object corresponding to the container image with a trusted state tag.

11. The method of claim 10, wherein displaying the result of the scanning comprises displaying an indication reflecting the trusted state of the object corresponding to the container image.

12. The method of claim 1, further comprising, when the container image is determined to be not trusted, generating or updating a database entry to associate an object corresponding to the container image with an untrusted state tag.

13. The method of claim 12, wherein displaying the result of the scanning comprises displaying an indication reflecting the untrusted state of the object corresponding to the container image.

14. A non-transitory machine readable storage medium to store machine readable instructions that, when executed by a machine, cause the machine to:
examine a virtual machine instance to identify a container image built in the virtual machine instance, wherein the virtual machine instance provides a plurality of microservices;
scan the container image, wherein the scanning comprises determining whether the container image is trusted based on determining whether an identified security issue is contained in at least one of a first list representing security issues associated with untrustworthiness or a second list representing security issues associated with trustworthiness;
scan an image of the virtual machine instance;
assign a label to the container image representing a degree of trust associated with the container image based on the scanning of the container image;
assign a label to the virtual machine instance representing a degree of trust associated with the virtual machine instance;
store the label assigned to the container image and an identifier for the container image as an entry in a database; and
store the label assigned to the virtual machine instance and an identifier for the virtual machine instance as an entry in the database.

15. The storage medium of claim 14, wherein the instructions, when executed by the machine, cause the machine to scan the container image for program code associated with defining secure mode computing.

16. The storage medium of claim 14, wherein the instructions, when executed by the machine, cause the machine to scan the container image for program code associated with exposing a privileged operating system kernel connection to an instance of the container image.

17. The storage medium of claim 14, wherein the instructions, when executed by the machine, further cause the machine to scan the container image for an environmental variable containing a private key.

18. An apparatus comprising:
at least one processor; and
a memory to store instructions that, when executed by the at least one processor, cause the at least one processor to:
detect a container image built inside a virtual machine instance, wherein the virtual machine instance provides a plurality of microservices;
perform a security scan of the container image and the virtual machine instance, wherein the scanning comprises determining whether the container image is trusted based on determining whether an identified security issue is contained in at least one of a first list representing security issues associated with untrustworthiness or a second list representing security issues associated with trustworthiness; and
display in a graphical user interface (GUI) as a result of the security scan.

19. The apparatus of claim 18, wherein the instructions, when executed by the at least one processor, further cause the at least one processor to:
- access a file containing instructions to build the container image;
- scan the file; and
- display a result of the scanning of the file in the GUI.

20. The apparatus of claim 18, wherein the instructions, when executed by the at least one processor, further cause the at least one processor to:
- identify a security issue in the scanning of the image of the virtual machine instance; and
- compare the security issue to a list of security issues to determine whether to trust the virtual machine instance.

21. The apparatus of claim 18, wherein the instructions, when executed by the at least one processor, further cause the at least one processor to apply machine learning to features of the virtual machine instance to determine whether to trust the virtual machine instance.

22. The apparatus of claim 21, wherein the instructions, when executed by the at least one processor, further cause the at least one processor to apply a supervised machine learning model trained on features of a plurality of virtual machine instances and classifications assigned to the virtual machine instances.

\* \* \* \* \*